United States Patent
Hanks (10) Patent No.: US 8,491,780 B2
(45) Date of Patent: Jul. 23, 2013

(54) HYDROPROCESSING OF BIOCOMPONENT FEEDSTOCKS WITH FCC OFF-GAS

(75) Inventor: Patrick L. Hanks, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 357 days.

(21) Appl. No.: 12/836,686

(22) Filed: Jul. 15, 2010

(65) Prior Publication Data

US 2011/0015454 A1 Jan. 20, 2011

Related U.S. Application Data

(60) Provisional application No. 61/271,108, filed on Jul. 17, 2009.

(51) Int. Cl.
*C10G 69/02* (2006.01)
(52) U.S. Cl.
USPC .......................................................... 208/60
(58) Field of Classification Search
None
See application file for complete search history.

(56) References Cited

U.S. PATENT DOCUMENTS

| | | |
|---|---|---|
| 6,156,695 A | 12/2000 | Soled et al. |
| 6,162,350 A | 12/2000 | Soled et al. |
| 6,299,760 B1 | 10/2001 | Soled et al. |
| 6,582,590 B1 | 6/2003 | Riley et al. |
| 6,712,955 B1 | 3/2004 | Hou et al. |
| 6,783,663 B1 | 8/2004 | Riley et al. |
| 6,863,803 B1 | 3/2005 | Riley et al. |
| 6,929,738 B1 | 8/2005 | Riley et al. |
| 7,229,548 B2 | 6/2007 | Riley et al. |
| 7,288,182 B1 | 10/2007 | Soled et al. |
| 7,410,924 B2 | 8/2008 | Canós et al. |
| 7,544,632 B2 | 6/2009 | Soled et al. |
| 2005/0277545 A1 | 12/2005 | Shih et al. |
| 2006/0060502 A1 | 3/2006 | Soled et al. |
| 2007/0084754 A1 | 4/2007 | Soled et al. |
| 2008/0132407 A1 | 6/2008 | Bai et al. |
| 2008/0154073 A1 | 6/2008 | Petri et al. |
| 2008/0161614 A1 | 7/2008 | Bertoncini et al. |
| 2009/0163744 A1 | 6/2009 | Abhari et al. |
| 2009/0301930 A1 | 12/2009 | Brandvold et al. |
| 2010/0292517 A1 | 11/2010 | Debuisschert et al. |

FOREIGN PATENT DOCUMENTS

| | | |
|---|---|---|
| EP | 1 719 811 A1 | 11/2006 |
| EP | 1 741 767 A1 | 1/2007 |
| GB | 2 074 602 A | 11/1981 |
| WO | WO 2004/007646 A1 | 1/2004 |
| WO | WO 2007/084437 A2 | 7/2007 |
| WO | WO 2007/084438 A2 | 7/2007 |
| WO | WO 2007/084439 A1 | 7/2007 |
| WO | WO 2008/040980 A1 | 4/2008 |
| WO | 2010/062390 A2 | 6/2010 |

*Primary Examiner* — Randy Boyer
(74) *Attorney, Agent, or Firm* — David M. Weisberg; Bruce M. Bordelon (57) ABSTRACT

A biocomponent feedstock can be hydroprocessed using an FCC off-gas as a hydrogen source. A relatively low cost catalyst, such as a water gas shift catalyst and/or spent hydrotreating catalyst, can be used as a hydrogenation catalyst for the process. The hydroprocessing can allow for olefin saturation and/or deoxygenation of the biocomponent feed by using a relatively low value refinery stream.

12 Claims, 3 Drawing Sheets

HYDROPROCESSING OF BIOCOMPONENT FEEDSTOCKS WITH FCC OFF-GAS

This application claims the benefit of U.S. Provisional Application 61/271,108 filed Jul. 17, 2009.

FIELD OF THE INVENTION

Systems and processes are provided for hydrotreatment of biocomponent feeds using a low value refinery stream as a hydrogen source.

BACKGROUND OF THE INVENTION

Fuels based on biocomponent sources will likely become increasingly prevalent in the future. Already, various governments have instituted current and future requirements that motor fuel pools contain a minimum percentage of fuel derived from a biocomponent source, such as a plant, animal, fish, or algae-based oil or fat.

For production of diesel fuel, vegetable oils such as canola oil, palm oil, or other similar oils have been identified as potentially suitable based on the carbon chain length of the vegetable oil. While some progress has been made toward stand alone processing and/or co-processing of biocomponent feeds, improvements to allow efficient processing in a refinery setting are greatly desired.

U.S. Patent Application Publication No. 2008/0154073 describes a process for removing oxygen from biocomponent molecules at low hydrogen pressure. The feed in this reference is exposed to a supported hydrogenation catalyst, such as Ni, NiMo, Pt, or Pd, in the presence of 150-290 psi hydrogen.

U.S. Patent Application Publication No. 2008/0161614 describes two stage co-processing of a feed including both vegetable/animal and mineral oil. According to this disclosure, the first stage is operated at lower severity to primarily treat the vegetable and/or animal oil in the feed. The product of the first stage is then stripped to remove gas phase impurities. The stripped product is then hydrotreated in a more severe hydrotreatment stage to produce a diesel fuel.

International Publication No. WO 2008/040980 describes reducing hydrogen consumption by controlling the products from reactions to remove oxygen from biocomponent feeds. Lower hydrogen pressures are mentioned as helping to reduce hydrogen consumption, but such pressures are mentioned as also leading to catalyst deactivation.

European Patent No. EP 1719811 describes a method for producing liquid hydrocarbons from biomass. The method includes forming an aqueous slurry of the biomass and particles of a layered catalyst, such as a clay. The slurry is heated to a temperature of 250-400° C. Up to 10 bars of hydrogen may optionally be added, although the publication indicates a preference to perform the process without added hydrogen.

European Patent No. EP 1741767 describes a process for producing diesel fuel from biocomponent sources. This reference states that the process reduces the needed hydrogen consumption by adding sulfur-containing compound to the biocomponent feed.

SUMMARY OF THE INVENTION

One aspect of the invention relates to a method for hydroprocessing a biocomponent feedstock, which comprises: treating an off-gas stream from a fluid catalytic cracking reactor to remove hydrogen sulfide and carbon dioxide, the treated off-gas stream having a hydrogen content of not more than 25%; and hydroprocessing a feedstock comprising a biocomponent portion in a reactor in the presence of the treated off-gas stream, a catalyst with hydrogenation activity, and steam under effective hydroprocessing conditions to produce a vapor effluent, an aqueous effluent, and a diesel boiling range product.

Another aspect of the invention relates to a system for hydroprocessing a biocomponent feed, which comprises: a hydroprocessing reactor, including an input conduit for introducing a biocomponent feedstock and a liquid effluent conduit; at least one catalyst in the hydroprocessing reactor having hydrogenation activity; a fluid catalytic cracking reactor, including at least one output conduit for removing an off-gas; an intervening conduit to provide fluid communication between the output conduit of the fluid catalytic cracking reactor and the input conduit of the hydroprocessing reactor; a scrubber for removing hydrogen sulfide and carbon dioxide from a flow in the intervening conduit; and a separator for separating an aqueous effluent from a diesel boiling range product in the liquid effluent conduit of the hydroprocessing reactor.

DETAILED DESCRIPTION OF THE EMBODIMENTS

In many refineries, availability of hydrogen is a limiting factor in how hydrocarbons are processed. A refinery typically generates some hydrogen during processing of a crude feed, such as during reforming of gasoline. This hydrogen can then be used to meet the hydrogen needs in the refinery, such as for hydroprocessing. Providing hydrogen from a separate, outside source in a refinery will often raise costs to a point that is not economical. Thus, when a new process is added in a refinery that requires hydrogen, the addition can often require a reduction in volume in another process.

Processing of biocomponent feedstocks to make a diesel fuel product presents such a hydrogen consumption problem in a refinery. Biocomponent feeds typically consume much higher amounts of hydrogen than a mineral feed having a similar boiling range. For example, removal of oxygen and saturation of aromatic bonds in a biocomponent feed could require up to about 5-7 times as much hydrogen as would be needed to hydrotreat a comparable mineral feed for sulfur and nitrogen removal. In such situations, each barrel of biocomponent feed processed by a refinery could require a reduction of as much as about 5-7 barrels in the amount of mineral diesel that is processed.

One option for overcoming the hydrogen consumption problem is to identify another refinery stream that can serve as a hydrogen source for treatment of a biocomponent feed. This option can minimize or avoid the need to reduce production of another product in order to treat the biocomponent feed.

In various embodiments, the invention allows a biocomponent feed to be hydrotreated with an alternative hydrogen source in order to remove the majority (i.e., more than 50% by weight) of the oxygen in the feed, and possibly substantially all (e.g., at least 95% by weight, preferably at least 98% by weight, for example at least 99% by weight, at least 99.5% by weight, at least 99.9% by weight, at least 99.95% by weight, at least 99.97% by weight, at least 99.98% by weight, at least 99.99% by weight, at least 99.995% by weight, or completely all) of the oxygen in the feed. Preferably, the biocomponent feed can be hydroprocessed using a fluid catalytic cracking (FCC) off-gas feed as the hydrogen source. Thus, the hydrogen feed for the reaction can be a gas stream that would normally be diverted in a refinery to a lower value use, such as service as a fuel gas. By making use of a relatively low value feed such as an FCC off-gas feed, the hydrogen needed for removing oxygen from a biocomponent feed need not be at the expense of performing another existing refinery process. The costs for this process can be further reduced by using a relatively low cost water gas shift catalyst, such as $Fe_3O_4$, as the hydrotreatment catalyst. After processing, the resulting biocomponent product may be suitable for use in the diesel fuel pool. Alternately, the biocomponent product can be mixed with a conventional diesel feed, e.g., which can include a second hydrotreatment step. However, because the majority of the oxygen should be removed in a dedicated process, the co-processing of the biocomponent product with a mineral feed should typically have a reduced or minimized amount of catalyst suppression/deactivation problems.

In some embodiments, one of the benefits of the invention is the ability to use a relatively low value refinery source (effluent stream) to treat a new type of refinery feed. The oxygen content in a biocomponent feed can create a variety of problems in a refinery. The oxygen content can be as high as about 12% by weight, meaning that a large amount of hydrogen may be needed to remove the oxygen by a hydrogenation type reaction. Biocomponent feeds can also have a tendency to suppress hydrodesulfurization (HDS) activity, making co-processing of a biocomponent feed challenging. However, the oxygen removal reaction can occur under relatively mild conditions and typically will not require relatively harsh conditions. Thus, a relatively low activity hydrogenation catalyst can be not only sufficient but also desirable to catalyze the hydrodeoxygenation (HDO) reaction. Similarly, low hydrogen partial pressures can often be sufficient to perform HDO. By using a relatively low cost catalyst and a relatively low value refinery stream for an initial processing step, the invention allows for production of a biocomponent based diesel product at reduced expense and with little or no significant impact on other refinery resources. In particular, significant amounts of hydrogen may not need to be diverted from another refinery operation for use in deoxygenating a biocomponent feed.

In various embodiments, a system and method are provided for hydroprocessing a biocomponent feed. The system and method can include providing a hydrotreatment reactor for processing of a biocomponent feed. The catalyst for the hydrotreatment reactor can be a relatively low cost water gas shift catalyst that also has sufficient hydrogenation activity. The hydrogen source for the hydrotreatment reaction can advantageously include and/or be the off-gas from an FCC reactor. Steam can also be introduced into the reactor to further facilitate hydrogen production via a water gas shift reaction. The hydrotreatment process can result in an effluent including a vapor product, a diesel boiling range product, and an aqueous product. Optionally, the diesel boiling range product can be co-processed with a mineral feed in a second hydrotreatment reactor. Optionally, the diesel boiling range product can be isomerized to improve the cold-flow properties.

In still other embodiments, the hydrogen in the FCC off-gas hydrogen stream can be supplemented with hydrogen from the main refinery hydrogen supply. In such embodiments, at least a portion of the hydrogen can be provided from the FCC off-gas stream, thus reducing the amount of hydrogen needed from the primary supply.

Feedstocks

As used herein, a "biocomponent feedstock" refers to a hydrocarbon feedstock (typically also containing some oxygen atoms) derived from a biological raw material component, such as vegetable fats/oils and/or animal fats/oils (including algae and fish fats/oils, respectively). Note that for the purposes of this document, vegetable fats/oils refer generally to any plant based material, and include fat/oils derived from a source such as plants from the genus *Jatropha*. The vegetable oils, animal fats, and algae fats/oils that can be used in the present invention can advantageously include any of those which comprise triglycerides and/or free fatty acids (FFA). The triglycerides and FFAs typically contain aliphatic hydrocarbon chains in their structure having from 8 to 36 carbons, preferably from 10 to 26 carbons, for example from 14 to 22 carbons. Other types of feed that are derived from biological raw material components include fatty acid esters, such as fatty acid alkyl esters (e.g., FAME and/or FAEE). Examples of biocomponent feedstocks include but are not limited to rapeseed (canola) oil, peanut oil, sunflower oil, tall oil, corn oil, soy oils, castor oil, jatropha oil, jojoba oil, olive oil, flaxseed oil, palm oil, and the like, and combinations thereof.

Biocomponent based diesel boiling range feedstreams can typically have low nitrogen and sulfur content. For example, a biocomponent based feedstream can contain up to about 300 parts per million by weight (wppm) nitrogen (in the form of nitrogen-containing compounds). Instead of nitrogen and/or sulfur, the primary heteroatom component in biocomponent based feeds is oxygen (in the form of oxygen-containing compounds). Suitable biocomponent diesel boiling range feedstreams can include up to about 10-12 wt % oxygen. In preferred embodiments, the sulfur content of the biocomponent feedstream can advantageously be about 15 wppm or less, preferably about 10 wppm or less, although, in some embodiments, the biocomponent feedstream can be substantially free of sulfur (e.g., can contain no more than 50 wppm, preferably no more than 20 wppm, for example no more than 15 wppm, no more than 10 wppm, no more than 5 wppm, no more than 3 wppm, no more than 2 wppm, no more than 1 wppm, no more than 500 wppb, no more than 200 wppb, no more than 100 wppb, no more than 50 wppb, or completely no measurable sulfur).

In some embodiments, the diesel boiling range product from hydrotreatment of the biocomponent feedstock can be mixed with a mineral feed and the combination sent for further processing. The mineral feedstream can have a boiling range from about 150° C. to about 400° C., preferably from about 175° C. to about 350° C. Mineral feedstreams for blending with a biocomponent feedstream can have a nitrogen content from about 50 to about 6000 wppm nitrogen, for example from about 50 to about 2000 wppm, such as from about 75 to about 1000 wppm nitrogen. In an embodiment, feedstreams suitable for use herein can have a sulfur content from about 100 to about 40000 wppm sulfur, for example from about 200 to about 30000 wppm, such as from about 350 to about 25000 wppm. In some embodiments, the mineral stream for blending with the biocomponent stream can be a diesel boiling range stream. In other embodiments, the mineral stream can be a higher boiling range stream, such as an atmospheric or vacuum gas oil. In still other embodiments, the mineral stream can be a lower boiling range stream, such as a heavy naphtha, a virgin naphtha stream, or an other virgin distillate. Other examples of suitable mineral streams can include resid, cycle oils (e.g., light cycle oil), and coker derived oils, as well as combinations of any of these and/or any of the other aforementioned streams.

In alternative embodiments, a mineral diesel boiling range feed can be mixed with the biocomponent feed, e.g., prior to treatment with the FCC off-gas and water gas shift catalyst. In such embodiments, the water gas shift catalyst should preferably be selected from catalysts that have a higher sulfur resistance. Due to the increased sulfur content in typical mineral oil feeds, an $Fe_3O_4$ catalyst can rapidly be converted to some type of iron sulfide. Iron sulfides tend to have low activity for promoting hydrogenation type reactions. In such embodiments, the mineral feed can preferably be a lighter distillate feed, such as a kerosene, jet, or light gas oil feed.

Gas Feeds

In various embodiments, a hydrogen source for hydroprocessing of the biocomponent feedstock can be the off-gas from a fluid catalytic cracking (FCC) reactor. During a fluid catalytic cracking process, heavier hydrocarbon molecules are "cracked" to form lighter molecules. The process typically also generates light side products such as hydrogen, carbon oxides, light ends, and water. The light ends represent a mix of low weight hydrocarbon compounds, such as methane and ethane. Hydrogen sulfide can also be produced, if the feed to the FCC unit includes sulfur compounds, which is a typical situation. As the desired products from an FCC unit are separated or distilled out, these light gas products can be separated into an "off-gas". Because of the variety of compounds in the off-gas, and because of its relatively low hydrogen concentration, the off-gas from an FCC reactor is conventionally viewed as a relatively low value stream. With regard to hydrotreatment reactions, FCC off-gas is conventionally viewed as having several problems. FCC off-gas is typically a relatively low pressure stream with a relatively low $H_2$ concentration (e.g., having a total stream pressure of about 50 psig (345 kPag), possibly up to about 100 psig (690 kPag), and a $H_2$ concentration of less than about 20%). Substantial pressure uplift would be needed to achieve hydrogen partial pressures typically indicative of hydrotreatment. Additionally, as CO is a known suppressing agent for hydrotreatment reactions, increased CO content of an FCC off-gas can tend to reduce the overall hydrotreatment activity. Typically, the off-gas from an FCC unit is used as fuel for generating heat in the refinery, based on the $H_2$ and light ends contents of the off-gas.

However, instead of using the FCC off-gas as a fuel source, various embodiments of the invention can allow the FCC off-gas to serve as a hydrogen source for hydroprocessing of a biocomponent feed. Both olefin saturation ($C^=$ sat) and HDO can occur at relatively mild conditions, with olefin saturation being the more facile reaction. Thus, the relatively low $H_2$ content of the FCC off-gas may be sufficient for the reaction. Additionally, even though CO may suppress the activity of the catalyst, the activity can preferably remain high enough to sufficiently deoxygenate the biocomponent feed (e.g., to remove the majority of the oxygen in the feed, and possibly to remove substantially all of the oxygen in the feed).

The FCC off-gas can be the off-gas from a conventional FCC unit. A typical FCC off-gas stream can include, inter alia, light ends, $H_2$, CO, $CO_2$, and $H_2S$. Other components may also be possible, depending on the FCC reactor feed chemistry and/or conditions. Such an off-gas can be used directly as a hydrogen source for HDO of a biocomponent feed according to the invention. However, in preferred embodiments, the off-gas stream can be scrubbed prior to use. Scrubbing of the FCC off-gas stream can reduce (preferably significantly) the concentration of $H_2S$ and/or $CO_2$ in the off-gas stream. An example of a suitable scrubber is an amine tower, which can use, e.g., diethylamine (DEA) or methylamine to capture $H_2S$ and $CO_2$. Note that CO is typically not removed in substantial amounts by this type of scrubber. After scrubbing, the off-gas can typically have an $H_2$ content of about 15 wt % to about 20 wt % and a CO content of about 2 wt % to about 5 wt %, with most or all of the remainder of the gas typically being light ends. The $H_2$ content of the off-gas could vary over a wider range, such as from about 10 wt % to about 25 wt %, depending on the nature of the FCC reaction and/or of the FCC feeds/products.

Significant removal of $H_2S$ can be beneficial for maintaining the reactivity of the catalyst. Preferred water gas shift catalysts according to the invention include predominantly transition metal oxides, such as iron, chromium, copper, zinc, and combinations thereof. In the presence of $H_2S$, at least a portion of the catalyst may convert to sulfide(s), which tend to be less desirable catalysts for the various embodiments of the invention. In some embodiments, scrubbing the FCC off-gas can result in a significant reduction in off-gas sulfur content, e.g., corresponding to a concentration of sulfur compounds of 15 vppm or less, for example 10 vppm or less. In certain embodiments, the scrubbed FCC off-gas can preferably have an $H_2S$ concentration of less than 50 vppm.

Removal of $CO_2$ can be beneficial for increasing the amount of hydrogen produced in situ in the reaction. The water gas shift reaction approximates an equilibrium process, where $H_2O$ and CO can be reversibly reacted to form $H_2$ and $CO_2$, i.e., $H_2O+CO \leftrightarrows H_2+CO_2$.

Because this resembles an equilibrium process, an increase in one of the participating species in the reaction can tend to drive the reaction to reduce that concentration. Thus, providing an excess of $CO_2$ can tend to drive this reaction to form more $H_2O$ and CO. Since $H_2$ is a desired product from this reaction, reducing the $CO_2$ level should enhance the amount of $H_2$ produced via the water gas shift reaction.

The production of $H_2$ can be further enhanced by introducing steam into the reactor during a hydroprocessing step. Steam provides additional water as a reactant, which can help drive the formation of additional $H_2$. In some embodiments where steam is added, it may be possible to reduce the amount of steam addition once the hydrotreatment process is started, as deoxygenation of the biocomponent feed can often lead to some water production.

Catalyst

In various embodiments, hydroprocessing can be performed in the presence of a relatively low cost catalyst, such as a water gas shift catalyst. Water gas shift activity is typically beneficial for producing additional hydrogen (and $CO_2$) from $H_2O$ (and CO) in the off-gas and/or in the reactor.

A preferred catalyst includes an oxide of iron, such as $Fe_3O_4$. Iron oxides with water gas shift activity may be advantageous. Other water gas shift catalysts that also have hydrogenation activity can include supported catalysts such as ZnO and/or CuO, e.g., supported on alumina, iron oxide catalysts promoted with $CrO_2$, or the like, or combinations thereof. Water gas shift catalysts can advantageously be exposed to a reducing environment prior to use. Because biocomponent feeds typically have low sulfur contents, the catalysts should be able to maintain activity (e.g., HDO activity) for a reasonable amount of processing time (e.g., from about 6 months to about 10 years, preferably from about 1 year to about 5 years, for instance from about 18 months to about 4 years).

More generally, suitable catalysts can include those comprising one or more Group VIII metals and one or more Group VIB metals, for example comprising Ni and/or Co and W and/or Mo, preferably comprising a combination of Ni and Mo, or Co and Mo, or a ternary combination such as Ni, Co, and Mo or such as Ni, Mo, and W. The or each hydrotreatment catalyst is typically supported on an oxide such as alumina, silica, zirconia, titania, or a combination thereof, or another known support material such as carbon. Such catalysts are well known for use in hydrotreatment and hydrocracking.

A NiMo catalyst is preferably used to initiate olefin saturation at a lower inlet temperature. Most units are constrained by a maximum operating temperature, and large amounts of heat are released from treatment of biofeeds. Initiating olefin saturation at lower temperature with NiMo allows for longer cycle lengths (as the maximum temperature will be reached later) and/or permits processing of more biofeeds.

A CoMo catalyst is preferably used for lower hydrogen partial pressure desulfurization and to slow down the kinetics of biofeed treatment. Spreading the exotherm out throughout the process by having such a lower activity catalyst will reduce the number of hotspots (which decrease in efficiency of the unit, and potentially give rise to structural issues if near reactor walls). At high hydrogen partial pressures, the use of CoMo may also reduce the amount of methanation (e.g., $CO+3H_2 \rightarrow CH_4+H_2O$ and/or $CO_2+4H_2 \rightarrow CH_4+2H_2O$) that occurs, which helps to reduce hydrogen consumption.

One option could be to use a spent NiMo and/or CoMo catalyst. Such catalyst(s) tends to have a reduced activity for conventional hydrotreatment processes (such as HDS and/or HDN), but may still have sufficient activity for olefin saturation and/or HDO. Hydrotreating catalysts such as NiMo and/or CoMo can be preferred in certain situations, e.g., where the biocomponent feed may be blended with a sulfur-containing mineral feed prior to exposure to the FCC off-gas hydrotreatment reactor.

As used herein, the terms "CoMo" and "NiMo" refer to comprising oxides of molybdenum and either cobalt or nickel, respectively, as catalytic metals. Such catalysts may also optionally include supports and minor amounts of other materials such as promoters. By way of illustration, suitable hydrotreating catalysts are described, for example, in one or more of U.S. Pat. Nos. 6,156,695, 6,162,350, 6,299,760, 6,582,590, 6,712,955, 6,783,663, 6,863,803, 6,929,738, 7,229,548, 7,288,182, 7,410,924, and 7,544,632, U.S. Patent Application Publication Nos. 2005/0277545, 2006/0060502, 2007/0084754, and 2008/0132407, and International Publication Nos. WO 04/007646, WO 2007/084437, WO 2007/084438, WO 2007/084439, and WO 2007/084471, inter alia.

Reaction Conditions

The biocomponent feedstock, optionally but preferably steam, and FCC off-gas can be introduced into a reactor containing a catalyst having water gas shift activity and/or another type of hydrogenation catalyst. The biocomponent feed can advantageously be exposed to the catalyst under conditions effective for removing oxygen from the feed. In some embodiments, the conditions can be effective for removing substantially all of the oxygen. In alternative embodiments, the conditions can be effective for removing at least 50 wt % of the oxygen, for example at least 80 wt %, at least 85 wt %, or at least 90 wt %. In such alternative embodiments, the conditions can typically be effective for removing 99 wt % or less of the oxygen, for example 98 wt % or less or 95 wt % or less. In such alternative embodiments, the processed biocomponent feed can be mixed with a mineral diesel boiling range feed and may be co-processed in a hydrotreatment reactor to further remove oxygen from the biocomponent feed.

In situations where the biocomponent feed is exposed to the catalyst, (optional but preferable) steam, and FCC off-gas, the conditions can be effective for saturating olefins and/or removing oxygen from the feed. The conditions can include an LHSV of about 0.5 $hr^{-1}$ to about 1.5 $hr^{-1}$ and a temperature of about 550° F. to about 700° F. (about 288° C. to about 371° C.), preferably about 600° F. to about 650° F. (about 315° C. to about 343° C.). Note that the temperature range represents a balancing of hydrogenation activity for oxygen removal and water gas shift activity. Conversion of CO and $H_2O$ into $CO_2$ and $H_2$ is an exothermic process. Because the water gas shift reaction also resembles an equilibrium process, increases in temperature can tend to drive the reaction toward CO and $H_2O$ formation.

Due to the nature of the FCC off-gas as a hydrogen source, there can be several alternatives for treat gas rate and reaction pressure. A typical FCC off-gas can generally have a pressure of about 50 psig to about 100 psig (about 345 kPag to about 690 kPag). In some embodiments, a pump can be used to increase the pressure of the FCC off-gas feed to a higher value, such as about 300 psig to about 400 psig (about 2.1 MPag to about 2.8 MPag). Since the FCC off-gas can generally comprise about 15% to about 20% hydrogen by volume, its hydrogen partial pressure can roughly be about 50 psig to about 80 psig (about 345 kPag to about 552 kPag). In other embodiments, the FCC off-gas can be used at the pressure generated as an output from the FCC reactor. In still other embodiments, the FCC off-gas can be used at a pressure from about 50 psig to about 400 psig (about 345 kPag to about 2.8 MPag). In any of these embodiments, the hydrogen in the off-gas can optionally be supplemented with one or more other hydrogen streams of higher purity, e.g., to increase the partial pressure of hydrogen in the reactor, and thus to increase the olefin saturation and/or HDO activity.

In embodiments involving a co-current reactor, the relatively low hydrogen partial pressure can be partially accommodated by increasing the amount of FCC off-gas used relative to the amount of biocomponent feed. As a practical matter, a typical refinery will generally have an existing FCC reactor that generates an off-gas of a given flow rate. Depending on the size of the FCC unit, the FCC off-gas flow rate could be from about 500,000 scf/day to about 50,000,000 scf/day (about 14,000 $Nm^3$/day to about 1.4 $Nkm^3$/day). The amount of biocomponent feed processed using the FCC off-gas can be adjusted to yield a desired treat gas ratio of FCC off-gas to biocomponent feed. For example, an FCC unit generating about 20,000,000 scf/day (about 0.57 $Nkm^3$/day) of off-gas could be used to treat about 2000 barrels (bbl) per day of a biocomponent feed. This would roughly correspond to a treat gas ratio of about 10,000 scf/bbl (about 1700 $Nm^3$/$m^3$) for the total feed, and a hydrogen treat gas ratio of about 1500 scf/bbl to about 2000 scf/bbl (about 250 $Nm^3$/$m^3$ to about 340 $Nm^3$/$m^3$), based on an off-gas hydrogen content of about 15-20% by volume.

In some embodiments, some portions of the reaction can be performed in a counter-current reactor. In such a situation, the direction of flow for the biocomponent feed during processing would be opposite from the direction of flow for the FCC off-gas. When present, steam may also typically flow in the opposite direction from the biocomponent feed during counter-current operation. In embodiments including a counter-current reactor, the feed can enter the reactor at the top, while the FCC off-gas and steam flows can enter at the bottom. As the gas travels up the reactor, it can typically become depleted of hydrogen, generally leading to lower hydrogen partial pressures near the top of the reactor. One advantage of this counter-current scheme can be that the lowest hydrogen partial pressures can encounter the feed when it first enters the reactor. The lower partial pressure of hydrogen should be sufficient to saturate olefins within the biocomponent feed, leaving the higher hydrogen pressure at the bottom of the reactor to effectuate HDO.

Another potential advantage of a counter-current design can be the ability to modify the temperature profile across the reactor, e.g., to enhance hydrogen production via water gas shift. In the water gas shift reaction, production of hydrogen (and $CO_2$) from water and CO is exothermic. Thus, decreasing the temperature in the reaction environment can cause the water gas shift equilibrium to favor more hydrogen production. In an embodiment, the temperature can be varied within the counter-current reactor so that lower reaction temperatures are found near the top of the reactor and so that higher reaction temperatures are found near the bottom.

The reaction can produce up to three types of effluent streams (or more). One type of stream can include a vapor effluent stream. The vapor effluent can include unreacted $H_2$, any CO and/or $CO_2$, water vapor, light ends, and any other light products, e.g., that may have been introduced to the reactor with the FCC off-gas stream. The vapor effluent can be used as a fuel gas, when the light ends content of this stream is high enough to have fuel value. Another type of effluent stream can include a diesel boiling range product stream, which can advantageously comprise a majority of the processed biocomponent feedstock. The third type of stream can include an aqueous output stream, which can comprise water introduced with the biocomponent feed and/or from steam used to drive the water gas shift reaction. This aqueous stream can also include some level of dissolved organics and other particulate and/or dissolved impurities, which can, in some embodiments, be passed to a waste treatment facility.

In some embodiments, the diesel boiling range product stream can be suitable for incorporation into the diesel fuel pool. Alternately, the diesel boiling range product stream can be subjected to further processing. One type of further processing can include removal of at least a portion of any undesirable heteroatoms (e.g., nitrogen and/or sulfur) remaining in the diesel boiling range product. In the case of sulfur, this can be done using a caustic solution or other wash to remove hydrogen sulfides, or through a sulfur adsorption step, such as by exposing the liquid stream to metallic Ni, ZnO, or another adsorber of sulfur species, in order to remove mercaptans and/or carbonyl sulfides. Another type of further processing can include recycling of a portion of the product to the inlet of the reactor, e.g., for temperature control. Still another alternative can include stripping the diesel boiling range product of dissolved gases.

Additional hydroprocessing of the diesel boiling range product is also possible. In some embodiments, the diesel boiling range product can be exposed to a hydroisomerization catalyst under effective hydroisomerization conditions. Performing a hydroisomerization process on the diesel boiling range product can improve the cold-flow properties of the product. Advantageously, the hydroisomerization reaction could also simultaneously remove low levels of sulfur and/or oxygen from the diesel boiling range product.

In the optional hydroisomerization stage, the diesel boiling range product can be exposed to one or more reaction zones, optionally present in a separate reactor, that are operated at hydroisomerization conditions in the presence of hydroisomerization catalyst. Generally, catalytic dewaxing can be accomplished by selective hydrocracking or by hydroisomerizing long chain molecules within a feed such as a diesel boiling range feed. Dewaxing catalysts can include, but are not necessarily limited to, molecular sieves such as crystalline aluminosilicates (zeolites) or silicoaluminophosphates (SAPOs). These molecular sieve catalysts may also carry a metal hydrogenation component, such as a Group VIII metal, especially a Group VIII noble metal. Dewaxing conditions can include temperatures of about 250° C. to about 450° C., preferably about 280° C. to about 380° C., pressures of about 300 psig to about 3000 psig (about 2.1 MPag to about 20.7 MPag), LHSV values of about 0.1 $hr^{-1}$ to about 5.0 $hr^{-1}$, and treat gas ratios of about 500 scf/bbl to about 5000 scf/bbl (about 84 $Nm^3/m^3$ to about 840 $Nm^3/m^3$).

In various embodiments, the molecular sieve used for catalytic dewaxing can comprise an aluminosilicate, e.g., having an MRE framework zeolite such as ZSM-48, which is a 10-membered ring molecular sieve having a 1-D channel structure. ZSM-48-type molecular sieves can perform dewaxing primarily by isomerizing molecules within the feed. Typical silica to alumina ratios for the aluminosilicate can be from about 250 to 1 or less, or from 200 to 1. Preferably, the silica to alumina ratio of the aluminosilicate can be less than about 110 to 1, for example less than about 110 to about 20 or from about 100 to about 40. To form a catalyst, the molecular sieve can be composited with a binder. Suitable binders can include, but are not limited to silica, alumina, silica-alumina, titania, zirconia, or a mixture thereof. Other suitable binders will be apparent to those of skill in the art.

Another hydroprocessing option can include mixing the diesel boiling range product with a mineral diesel feed and then hydrotreating the mixed feed. This option can be preferred, particularly in cases where initial hydrotreating (e.g., HDO) of the biocomponent feed does not sufficiently lower the heteroatom (e.g., oxygen) content. By removing a majority of the heteroatoms (e.g., oxygen) in the initial hydrotreating (e.g., HDO) stage, suppression of catalytic activity due to the remaining heteroatoms (e.g., oxygen) can be reduced or minimized. Thus, the hydrotreatment stage for the mixed biocomponent and mineral feed can advantageously be a stage where substantial sulfur removal occurs for the mineral feed. Hydrotreatment of the mixed biocomponent and mineral feed can also advantageously produce a diesel boiling range product. This diesel boiling range product can be added to the diesel fuel pool, or it can undergo any of the types of further processing mentioned above.

In embodiments where a mineral feed is mixed with the biocomponent feed prior to a hydrotreatment step, the mineral feed can preferably be a diesel boiling range feed. Mineral feedstreams for blending with a biocomponent feedstream can have a nitrogen content from about 50 to about 6000 wppm nitrogen, for example from about 50 to about 2000 wppm, such as from about 75 to about 1000 wppm nitrogen. In an embodiment, feedstreams suitable for use herein can have a sulfur content from about 100 to about 40000 wppm sulfur, for example from about 200 to about 30000 wppm, such as from about 350 to about 25000 wppm. Suitable diesel boiling range feedstreams can boil within the range of about 215° F. (about 102° C.) to about 800° F. (about 427° C.). Preferably, the diesel boiling range feedstream has an initial boiling point of at least about 250° F. (about 121° C.), or at least about 300° F. (about 149° C.), or at least about 350° F. (about 177° C.), or at least about 400° F. (about 204° C.), or at least about 451° F. (about 233° C.). Preferably, the diesel boiling range feedstream has a final boiling point of about 800° F. (about 427° C.) or less, for example about 775° F. (about 413° F.) or less or about 750° F. (about 399° C.) or less. In an embodiment, the diesel boiling range feedstream has a boiling range from about 451° F. (233° C.) to about 800° F. (427° C.). In another embodiment, the diesel boiling range feedstream also includes kerosene range compounds to provide a feedstream with a boiling range from about 250° F. (121° C.) to about 800° F. (427° C.).

Reaction System

The reactor used for deoxygenating the biocomponent feed can be a hydroprocessing reactor, such as a reactor suitable for performing a hydrotreatment process. The reactor can be configured to operate in a co-current or counter-current manner. If the reactor is configured for counter-current operation, the reactor can be a fixed bed reactor in one embodiment, with the biocomponent feed flowing in the opposite direction relative to both the FCC off-gas flow and, if present, the steam flow. If the reactor is configured for co-current operation, either fixed or fluidized beds may be used.

The reaction system can include several inputs for the reactor. In addition to the biocomponent feedstock, input conduits can also be available for the FCC off-gas and optionally but preferably for steam. The input conduit for the FCC off-gas can receive the off-gas from a scrubber that removes at least a portion of the $H_2S$ and at least a portion of the $CO_2$ present in the off-gas. The reaction system can also include a catalyst. If the reactor is a fixed bed reactor, the reactor may include one or multiple beds of catalyst. The effluent from the reactor can be sent to a separator, e.g., to produce three output streams, including a vapor effluent, an aqueous effluent, and a diesel boiling range product.

The catalyst in the second hydrotreatment reactor can be a catalyst whose active ingredients include a Group VIB metal and/or a Group VIII metal, optionally on a support. Suitable metals can include nickel, cobalt, molybdenum, tungsten, or a combination thereof. Suitable supports can include silica, silica-alumina, alumina, titania, or a combination thereof.

The reaction conditions in the second hydrotreatment reactor can be those suitable for reducing the sulfur content of the feedstream to about 15 wppm or less, preferably about 10 wppm or less, as the feedstream is exposed to the catalyst bed(s) in the reaction zone. The reaction conditions can include an LHSV from about $0.1$ $hr^{-1}$ to about $10$ $hr^{-1}$, a total pressure from about 100 psig to about 4000 psig (about 690 kPag to about 27.6 MPag), a treat gas rate from about 100 scf/bbl to about 10,000 scf/bbl (about 17 $Nm^3/m^3$ to about 1700 $Nm^3/m^3$), where the treat gas contains at least 95% hydrogen by volume, and a temperature from about 450° F. to about 800° F. (about 232° C. to about 427° C.).

Figure 1:
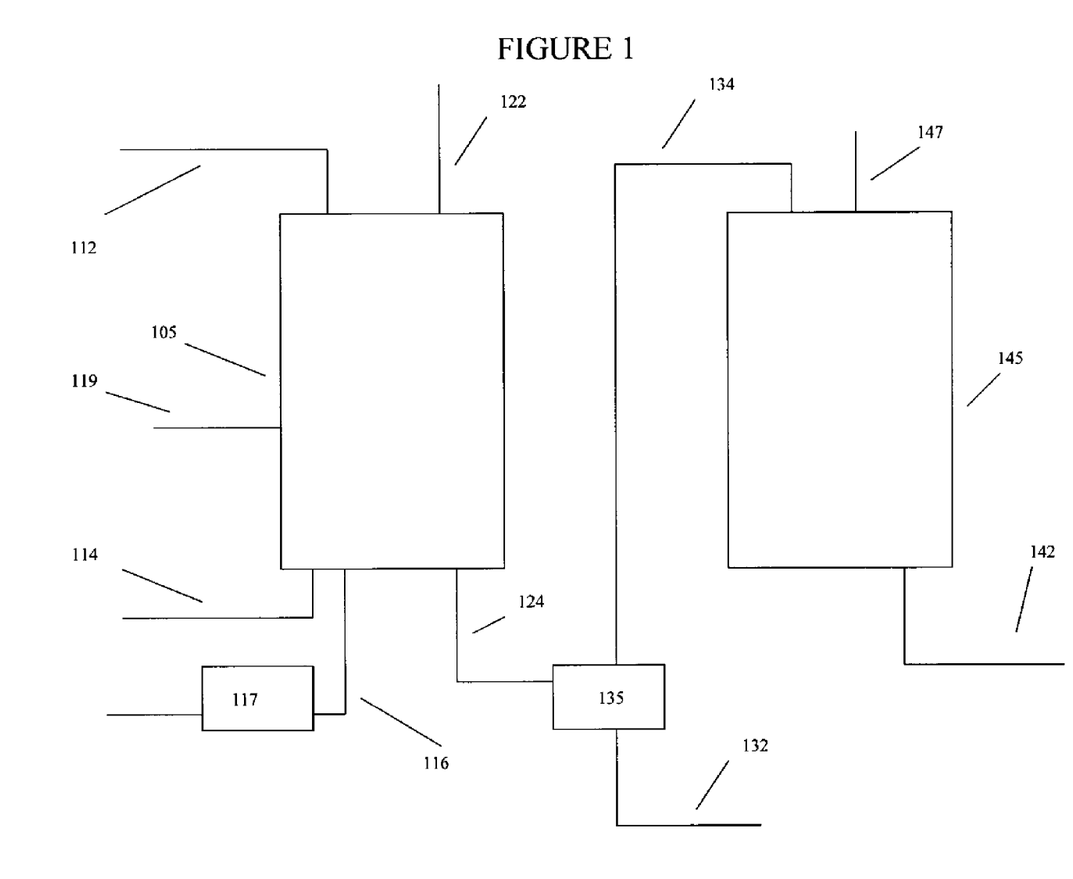
FIG. 1 schematically shows a reaction system for performing a process according to an embodiment of the invention.

A reaction system suitable for performing an embodiment of the invention is schematically shown in FIG. 1. In FIG. 1, reactor 105 has several input conduits. Feed conduit 112 provides a biocomponent feedstock for processing. Steam conduit 114 (optional but preferable) provides steam to reactor 105. Conduit 116 provides to the reactor a hydrogen source comprising an FCC off-gas. As needed or desired, the FCC off-gas can pass through scrubber 117 (optional) prior to entering conduit 116 for passage to reactor 105. Based on the arrangement of input feeds, reactor 105 is configured for counter-current operation; however, it will be appreciated that co-current reactor operation can be effected with appropriate rearrangement of the layout in FIG. 1. Optionally, an additional hydrogen feed 119 may be provided to the reactor, e.g., to increase the hydrogen partial pressure as necessary. As shown in FIG. 1, the additional hydrogen feed 119 may be added at an intermediate point in the reactor. However, additional hydrogen can additionally or alternately be introduced through or more proximal to conduit 116 (and/or may be passed through optional scrubber 117), along with other hydrogen and/or other gases.

Products from reactor 105 can exit via one or more conduits. Vapor conduit 122 provides an exit for gases and light products, e.g., that can be used as fuel gas. Liquid conduit 124 provides an exit for liquid effluent and links to a separator 135, where an aqueous effluent 132 can be separated from a diesel boiling range product 134. Separator 135 can also separate out any remaining gases and/or light products from diesel boiling range product 134. As shown in FIG. 1, diesel boiling range product 134 can be passed into optional hydroisomerization reactor 145. Therein, the diesel boiling range product can be exposed to a hydroisomerization catalyst in the presence of hydrogen from hydrogen input 147 to produce hydroisomerized diesel boiling range product 142.

Figure 2:
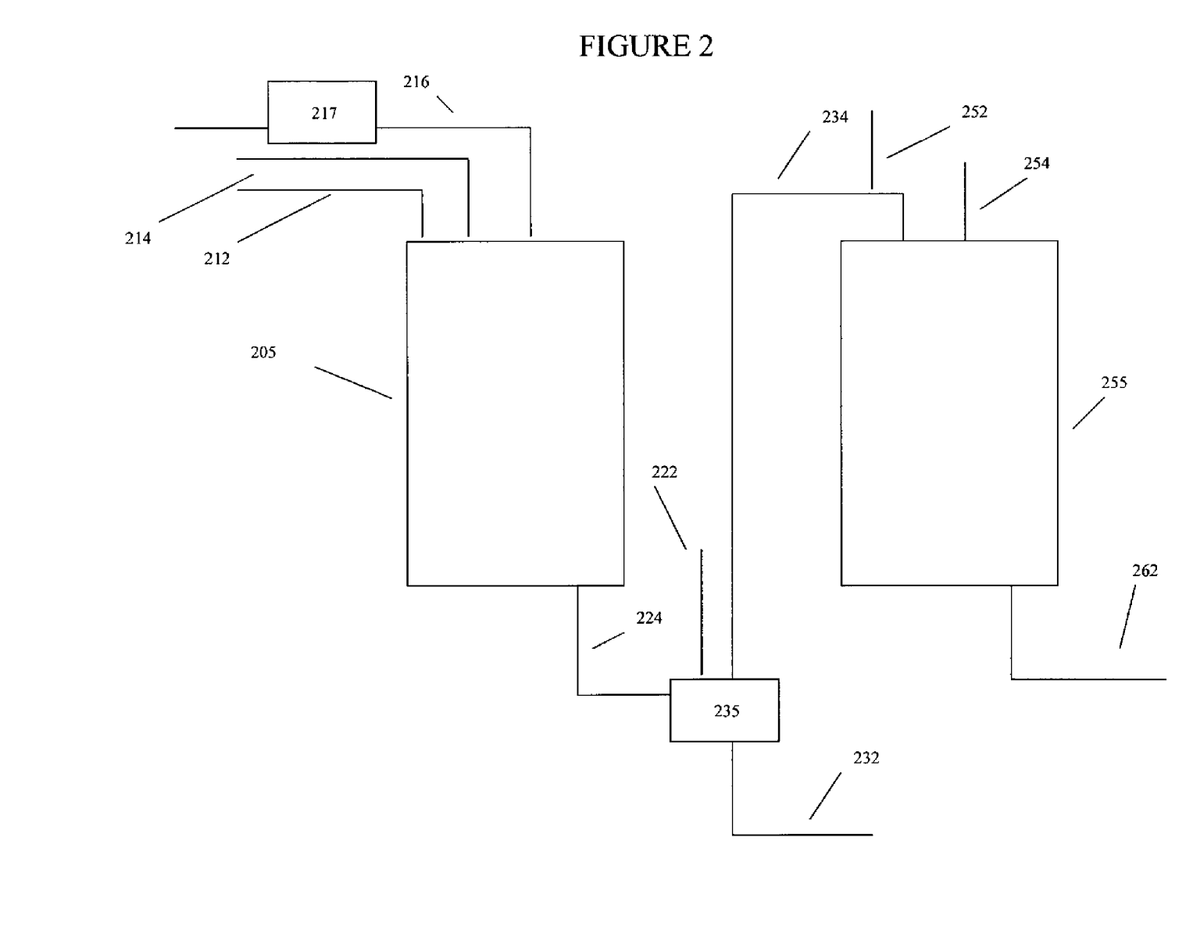
FIG. 2 schematically shows a reaction system for performing a process according to an embodiment of the invention.

Another reaction system suitable for performing an embodiment of the invention is schematically shown in FIG. 2. In FIG. 2, reactor 205 has several input conduits. Feed conduit 212 provides a biocomponent feedstock for processing. Steam conduit 214 (optional but preferable) provides steam to reactor 205. Conduit 216 provides to the reactor a hydrogen source comprising an FCC off-gas. As needed or desired, the FCC off-gas can pass through scrubber 217 (optional) prior to entering conduit 216 for passage to reactor 205. Based on the arrangement of input feeds, reactor 205 is configured for co-current operation; however, it will be appreciated that counter-current reactor operation can be effected with appropriate rearrangement of the layout in FIG. 2.

Effluent 224 from reactor 205 can enter separator 235, which can separate out vapor phase product 222 (e.g., that can be used as fuel gas), an aqueous effluent 232 for waste or further treatment (not shown), and diesel boiling range product 234. As shown in FIG. 2, diesel boiling range product 234 can optionally be mixed with a mineral diesel boiling range feed 252 and can then be passed into second hydrotreatment reactor 255, optionally along with additional hydrogen 254. The mixed feed can be hydrotreated in reactor 255 to produce mixed diesel boiling range product 262. This mixed diesel boiling range product can optionally be passed through a second separator (not shown) to remove contaminant gases, such as $H_2S$, prior to being used directly or added to the diesel fuel pool.

Figure 3:
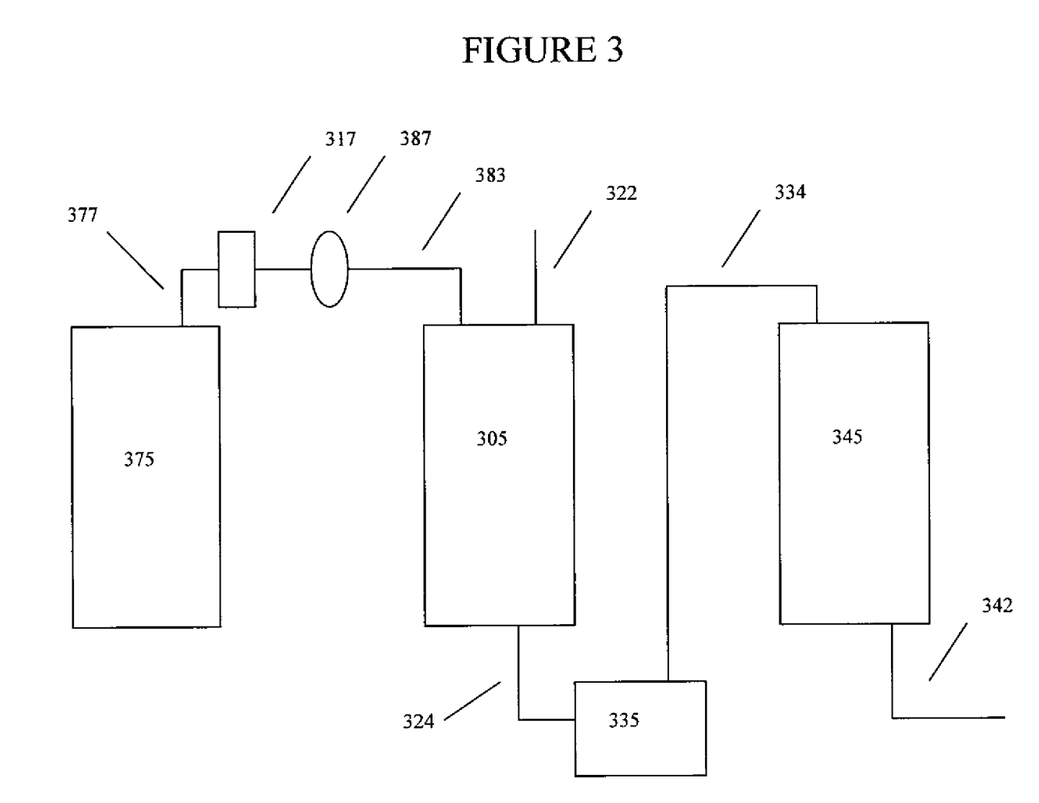
FIG. 3 schematically shows a reaction system for performing a process according to an embodiment of the invention.

FIG. 3 schematically shows the overall integration of a reaction system according to an embodiment of the invention within a refinery. In FIG. 3, the connectivity is shown between fluid catalytic cracking reactor 375 and hydroprocessing reactor 305 for processing a biocomponent feed. Fluid catalytic cracking reactor 375 can represent a conventional FCC reactor, having off-gas exit conduit 377. The off-gas can pass through this conduit, optionally but preferably through scrubber 317, and into intervening conduit 383. In FIG. 3, an optional pump 387 is also shown, if desired for increasing the pressure of the off-gas flow. Intervening conduit 383 introduces the optionally scrubbed and/or pressurized off-gas flow to hydroprocessing reactor 305. Hydroprocessing reactor 305 also receives biocomponent feed 322, and optionally also steam (not shown). After hydroprocessing, the liquid effluent can be passed to separator 335 via liquid effluent conduit 324. In some embodiments, liquid effluent conduit 324 can also include a vapor effluent, and separator 335 can also separate out this vapor, if present. Separator 335 can also produce a diesel boiling range product 334, which can optionally be passed to another hydroprocessing reactor, such as a hydroisomerization reactor 345. In such situation, the hydroisomerized diesel boiling range product 342 can be used directly or delivered to the diesel fuel pool.

EXAMPLES

In Example 1, a vegetable oil having an oxygen content from about 10% to about 12% and an unsaturation content of about 1.5 olefinic double bonds per molecule is hydroprocessed in a reactor using an FCC off-gas as a hydrogen source. Iron oxide (in this case, $Fe_3O_4$) is used as a hydrotreating catalyst and to promote the water gas shift reaction. The temperature in the reactor is about 650° F. (about 343° C.), and the LHSV is about 1.0 hr$^{-1}$. A pump is used to increase the pressure of the off-gas to about 250 psig (about 1.7 MPag). The treat gas ratio (amount of off-gas per amount of feed) is about 10,000 scf/bbl (about 1.7 Nm$^3$/m$^3$), and the hydrogen content of the FCC off-gas is about 15% by volume. An amount of steam corresponding to about 1% by volume of the treat gas is also introduced into the reactor. This produces a biocomponent feed with a reduced oxygen content.

In Example 2, a mixture of FAME and vegetable oil, collectively having an oxygen content from about 10% to about 12% and an unsaturation content of about 1.0 olefinic double bonds per molecule is hydroprocessed in a reactor using an FCC off-gas as a hydrogen source. A spent NiMo catalyst (having an HDS activity less than about 25% of the HDS activity of the same NiMo catalyst, either as measured before its initial use or after regeneration and rejuvenation) is used as a hydrotreating catalyst and to promote the water gas shift reaction. The pressure of the FCC off-gas is about 100 psig (about 690 kPag), and no additional pump is used to increase the pressure. The temperature in the reactor is about 675° F. (about 357° C.), and the LHSV is about 0.75 hr$^{-1}$. The treat gas ratio is about 12,000 scf/bbl (about 2,000 Nm$^3$/m$^3$), and the hydrogen content of the off-gas is about 14% by volume. An amount of steam corresponding to about 0.5% by volume of the treat gas is also introduced into the reactor. The liquid effluent from this process is separated and/or stripped to remove any gases, and then mixed with a diesel boiling range feedstream. This mixture is processed in the presence of a CoMo hydrotreating catalyst at conditions including a temperature of about 550° F. (about 288° C.), a total pressure of about 200 psig (about 1.4 MPag), an LHSV of about 1.0 hr$^{-1}$, and a treat gas ratio of about 1000 scf/bbl (about 170 Nm$^3$/m$^3$), where the treat gas contains at least 95% hydrogen by volume. This produces diesel boiling range product suitable for use as a diesel fuel.

Additional Embodiments

Embodiment 1

A method for hydroprocessing a biocomponent feedstock, comprising: treating an off-gas stream from a fluid catalytic cracking reactor to remove hydrogen sulfide and carbon dioxide, the treated off-gas stream having a hydrogen content of not more than 25%; and hydroprocessing a feedstock comprising a biocomponent portion in a reactor in the presence of the treated off-gas stream, a catalyst with hydrogenation activity, and steam under effective hydroprocessing conditions to produce a vapor effluent, an aqueous effluent, and a diesel boiling range product.

Embodiment 2

The method of embodiment 1, wherein the catalyst is a water gas shift catalyst.

Embodiment 3

The method of embodiment 2, wherein the water gas shift catalyst comprises an oxide of iron, copper, zinc, chromium, or a combination thereof.

Embodiment 4

The method of embodiment 3, wherein the water gas shift catalyst comprises Fe$_3$O$_4$.

Embodiment 5

The method of any one of the previous embodiments, wherein the feedstock is substantially free of sulfur.

Embodiment 6

The method of any one of the previous embodiments, wherein the treated off-gas stream is substantially free of sulfur.

Embodiment 7

The method of any one of the previous embodiments, wherein the catalyst comprises a spent hydrotreating catalyst.

Embodiment 8

The method of any one of the previous embodiments, wherein the effective hydroprocessing conditions include an LHSV from about 0.5 hr$^{-1}$ to 1.5 hr$^{-1}$, a temperature from about 600° F. to about 650° F. (about 316° C. to about 343° C.), and a hydrogen partial pressure from about 10 psig to about 200 psig (about 69 kPag to about 1.4 MPag).

Embodiment 9

The method of embodiment 8, wherein the hydrogen partial pressure is at least about 15 psig (about 103 kPag).

Embodiment 10

The method of any one of the previous embodiments, wherein the biocomponent portion is reacted in the presence of an additional hydrogen-containing stream.

Embodiment 11

The method of any one of the previous embodiments, wherein hydroprocessing the feedstock comprises introducing the feedstock into the reactor in a counter-current manner relative to the treated off-gas stream.

Embodiment 12

The method of any one of the previous embodiments, wherein the vapor effluent is used as a refinery fuel gas.

Embodiment 13

The method of any one of the previous embodiments, further comprising hydroisomerizing the diesel boiling range product.

Embodiment 14

The method of any one of the previous embodiments, further comprising mixing the diesel boiling range product with a mineral feed and hydrotreating the mixed feed under effective hydrotreating conditions.

Embodiment 15

A system for hydroprocessing a biocomponent feed, comprising: a hydroprocessing reactor, including an input conduit for introducing a biocomponent feedstock and a liquid effluent conduit; at least one catalyst in the hydroprocessing reactor having hydrogenation activity; a fluid catalytic cracking reactor, including at least one output conduit for removing an off-gas; an intervening conduit to provide fluid communication between the output conduit of the fluid catalytic cracking reactor and the input conduit of the hydroprocessing reactor; a scrubber for removing hydrogen sulfide and carbon dioxide from a flow in the intervening conduit; and a separator for separating an aqueous effluent from a diesel boiling range product in the liquid effluent conduit of the hydroprocessing reactor.

Embodiment 16

The system of embodiment 15, wherein the scrubber comprises an amine scrubber.

Embodiment 17

The system of embodiment 15 or embodiment 16, wherein the at least one catalyst comprises a water gas shift catalyst.

Embodiment 18

The system of any one of embodiments 15-17, further comprising a pump for increasing the pressure of a flow in the intervening conduit.

Embodiment 19

The system of any one of embodiments 15-18, further comprising a second hydroprocessing reactor, the second hydroprocessing reactor being in fluid communication with the separator for receiving the diesel boiling range product.

Embodiment 20

The system of embodiment 19, wherein the second hydroprocessing reactor is a hydroisomerization reactor.

What is claimed is:

1. A method for hydroprocessing a biocomponent feedstock, comprising:
    treating an off-gas stream from a fluid catalytic cracking reactor to remove hydrogen sulfide and carbon dioxide, the treated off-gas stream having a hydrogen content of not more than 25%; and
    hydroprocessing a feedstock comprising a biocomponent portion in a reactor in the presence of the treated off-gas stream, a catalyst with hydrogenation activity, and steam under effective hydroprocessing conditions to produce a vapor effluent, an aqueous effluent, and a diesel boiling range product;
    wherein the effective hydroprocessing conditions include an LHSV from about 0.5 $hr^{-1}$ to 1.5 $hr^{-1}$, a temperature from about 600° F. to about 650° F. (about 316° C. to about 343° C.), and a hydrogen partial pressure from about 15 psig to about 200 psig (about 103 kPag to about 1.4 MPag).

2. The method of claim 1, wherein the catalyst is a water gas shift catalyst.

3. The method of claim 2, wherein the water gas shift catalyst comprises an oxide of iron, copper, zinc, chromium, or a combination thereof.

4. The method of claim 3, wherein the water as shift catalyst comprises $Fe_3O_4$.

5. The method of claim 2, wherein the feedstock is substantially free of sulfur.

6. The method of claim 2, wherein the treated off-gas stream is substantially free of sulfur.

7. The method of claim 1, wherein the catalyst comprises a spent hydrotreating catalyst.

8. The method of claim 1, wherein the biocomponent portion is reacted in the presence of an additional hydrogen-containing stream.

9. The method of claim 1, wherein hydroprocessing the feedstock comprises introducing the feedstock into the reactor in a counter-current manner relative to the treated off-gas stream.

10. The method of claim 1, wherein the vapor effluent is used as a refinery fuel gas.

11. The method of claim 1, further comprising hydroisomerizing the diesel boiling range product.

12. The method of claim 1, further comprising mixing the diesel boiling range product with a mineral feed and hydrotreating the mixed feed under effective hydrotreating conditions.

* * * * *